United States Patent [19]
Coslovi et al.

[11] Patent Number: 5,842,821
[45] Date of Patent: Dec. 1, 1998

[54] CONTAINER SUPPORT PEDESTAL

[75] Inventors: Ilario A. Coslovi; Ronald S. Butcher, both of Burlington, Canada

[73] Assignee: National Steel Car Limited, Hamilton, Canada

[21] Appl. No.: 436,130

[22] Filed: May 8, 1995

[51] Int. Cl.[6] ............................. B60P 7/13; B61D 45/00
[52] U.S. Cl. ........................ 410/73; 410/72; 410/54; 410/57; 410/70; 410/76; 410/77
[58] Field of Search ................. 410/54, 57, 69–74, 410/76, 77; 292/240; 105/355, 416; 248/503, 500, 681

[56] References Cited

U.S. PATENT DOCUMENTS

| | | | |
|---|---|---|---|
| 1,845,594 | 2/1932 | Fildes | 410/72 X |
| 1,988,651 | 1/1935 | Fildes | 410/72 |
| 3,774,551 | 11/1973 | Sweger | 410/70 |
| 4,759,294 | 7/1988 | Schuller et al. | 410/54 X |
| 4,826,371 | 5/1989 | Brown | 410/54 |
| 4,867,622 | 9/1989 | Brown | 410/54 |
| 4,925,349 | 5/1990 | Yurgevich | 410/54 |
| 5,052,868 | 10/1991 | Hesch et al. | 410/54 |
| 5,106,247 | 4/1992 | Hove et al. | 410/73 |
| 5,246,321 | 9/1993 | Hesch | 410/73 X |

*Primary Examiner*—Stephen Gordon
*Attorney, Agent, or Firm*—Oldham & Oldham Co., L.P.A.

[57] ABSTRACT

This invention relates to a container support pedestal for use in an all purpose intermodal flat rail car. More particularly, the invention relates to a container support pedestal which, between operative and stored positions, rotates approximately 45° outwardly about a longitudinal axis of the rail car. The invention also relates to a support housing for the pedestal. In both the operative and stored positions, the pedestal substantially covers the slot in the platform of the rail car. In both positions, the pedestal is secured against longitudinal and transverse rotation. The invention also relates to a rail car with such a pedestal and housing.

25 Claims, 7 Drawing Sheets

CONTAINER SUPPORT PEDESTAL

This invention relates to a container support pedestal for use in an all purpose intermodal railway flat car, a housing for the pedestal and a rail car with such a pedestal and housing.

BACKGROUND OF THE INVENTION

As domestic and international trade increases and the movement of goods increasingly requires different modes of transportation, the use of intermodal cargo containers has increased. These types of containers may be shipped from a supplier, such as a manufacturer, a wholesaler or a grower, to a receiver, such as a processor, distributor or retailer, or between different locations of the same entity via different modes of transportation without opening, unloading or reloading the contents of the container until it reaches its final destination. The container may travel through any combination of shipping, air, railroad and trucking transportation modes.

Domestic intermodal shipments initially involved a higher percentage of highway trailers moving long distances on flat cars.

More recently, the percentage of intermodal containers has increased. It is desirable, on moderate density routes, to have a car which may carry either trailers or containers with a minimum of alteration between load types, rather than dedicated cars for a single load type.

The transportation of such intermodal containers by rail earlier involved a steel decked flat car with a deck about 85 to 89 feet long. The deck was equipped with fixed or folding container supports to enable support and securement of the container to the car. Alternatively or in combination, the car may have had folding trailer hitch pedestals.

With increasing use of such intermodal containers, a demand has arisen for longer and different sizes of containers to economically carry a wide variety of loads. The continuous development of such containers has resulted in standardized containers of five different lengths. Current containers generally measure 53, 48, 45, 40 or 20 feet in length and a modern railroad container car is typically adapted to handle all five lengths of containers.

The 85 to 89 feet long flat cars which could carry two 40 foot trailers or containers became less useful when container and trailer lengths increased beyond 40 feet. It is possible to ship one 40 foot and one 45 foot trailers on an 89 foot flat car, but the usefulness of this configuration depends on the availability of a suitable mix of loads.

The common container and trailer length is now 48 feet, with 53 feet becoming more common. The Association of American Railroads prohibits cars with deck lengths greater than 89 feet because of problems with curve negotiation. Such longer loads must then be carried individually on cars or articulated units.

A more recent design of a rail car used to transport such intermodal containers or trailers generally known as a "spine" type of flat car. A spine flat car has a deep box section centre sill with transverse members on each side to support containers by their corner castings and transverse members to support platforms on which highway trailer bogies may be supported. The front end of each trailer is supported over the centre sill by a fifth wheel type of trailer hitch mounted on a pedestal.

To keep the overall height of the trailer on the car, and the combined centre of gravity, as low as possible, the bogie platforms are usually mounted several inches below the top surface of the centre sill within the clearance limits of the trailer bogie axles.

When such containers are transported on container rail cars, the four corners of the longer containers, those that are 53, 48, 45 or 40 feet long, are generally secured with locking devices located at a nominal 40 feet spacing on the freight deck of the container car. However, when two shorter 20 foot long containers are transported on the same freight deck, their intermediate ends must be supported with additional intermediate support means which must be removable to prevent interference with the longer containers when the car is used for them.

The trailer hitch pedestals are made collapsible so that containers may be loaded above them while keeping the overall height and centre of gravity of the container reasonably low and minimizing the height of the container supports. The container supports which are located in the bogie platform area must be collapsible to avoid interfering with the trailer bogies when carrying trailers.

The current styles of collapsible container supports or pedestals are essentially rectangular columns pivoting about a longitudinal or transverse axis below the surface of the bogie platform. By way of example, U.S. Pat. No. 4,826,371 discloses a pedestal which folds inwardly about a longitudinal axis of the rail car. It is intended to locate the adjacent ends of 20 feet long containers and reduce the height of the centre support so that a long container resting on end supports will not bear on the centre support. This type of pedestal is not intended for a car which can also carry trailers.

A type of collapsible container support which rotates inwardly about a longitudinal axis is the current standard adopted by TTX. Co., the company which owns and rents the majority of the type of car in the United States. The TTX style of pedestal folds down through approximately 90° into an essentially horizontal storage position in a transverse recess in the platform. Typically, each such recess has a steel plate cover door. The cover door keeps the pedestal upright when not stored and prevents operators from stepping into the recess in the platform when the pedestal is raised. The pedestals are heavy to lift and the doors are subject to damage. When damaged, the cover doors are often difficult to move. This current style of container pedestal, whether fixed or collapsible, typically has a located cone on each container supporting surface and usually has a locking device to prevent an empty container from disengaging from the locating cone.

By way of further example, two forms of the current type of container pedestal are disclosed in U.S. Pat. No. 5,052, 868. One end pedestal folds about a transverse axis into a longitudinal pocket. This pedestal also is extremely heavy and difficult to lift and requires the operator to stand on the platform above the pedestal while lifting in a strain inducing position. The recess cover door is subject to damage when being struck by the pedestal and by trailer tires. When damaged, the cover door is often difficult to move. The recess has limited clearance below the pedestal so it is susceptible to blockage by snow.

Also disclosed in U.S. Pat. No. 5,052,868 is an intermediate pedestal for supporting the inner ends of shorter containers. This pedestal folds outwardly about a longitudinal axis and is stored by hanging in an inverted position. The pedestal is rotated to an operating position over top center where further inward rotation is prevented by a stop. This pedestal has no locking device to hold it upright so lateral motion of the car will cause the pedestals to rock within the clearances of the container corners and the pedestals.

The invention relates to a container support pedestal for use in an all purpose intermodal flat rail car. More particularly, the invention relates to a container support pedestal which, between operative and stored positions, rotates approximately 45° outwardly about a longitudinal axis of the rail car. The invention also relates to a support housing for the pedestal. In both the operative and stored positions, the pedestal substantially covers the slot in the platform of the rail car. In both positions, the pedestal is secured against longitudinal and transverse rotation. The invention also relates to a rail car with such a pedestal and housing.

SUMMARY OF THE INVENTION

The invention relates to a container support means for use on a freight vehicle. The container support means has a pedestal for supporting containers and means for rotating the pedestal from its operative position to its stored position outwardly less than 90° about a longitudinal axis of the vehicle. The container support means may be substantially vertical in the operative position. The angle of rotation may be less than 60°, may be between about 40° and about 50° or may be approximately 45°. In its stored position the axis of the supporting portion of the pedestal is at an angle less than 90° from vertical. In its stored position the axis of the supporting portion of the pedestal may be less than 60°, between 40° and 50° or approximately 45° from vertical.

The container support means provides means for supporting the pedestal. The container support means has a housing in the vehicle defining a space into which a substantial portion of the pedestal may be inserted when the pedestal is not in its operative position. The housing is primarily defined by a slot in the means for supporting the pedestal. The housing may also be defined in part by a slot in the platform of the vehicle. The configuration of the housing and the configuration of the pedestal may be such that, when the pedestal is in its operative position, the pedestal substantially fills the slot in the platform of the vehicle. The configuration of the housing and the configuration of the pedestal may be such that, when the pedestal is in its stored position, the pedestal substantially fills the slot in the platform of the vehicle. The configuration of the housing and the configuration of the pedestal may also be such that, when the pedestal is in its operative position and when the pedestal is in its stored position, the pedestal substantially fills the slot in the platform of the vehicle.

The freight vehicle may have a load bearing surface and a side curb of the bearing surface. The configuration of the pedestal may be such that, when the pedestal is in its stored position, the pedestal forms part of the load bearing surface of the vehicle. The configuration of the pedestal may also be such that, when the pedestal is in its stored position, the pedestal forms part of the side curb of the load bearing surface. The configuration of the pedestal may also be such that, when the pedestal is in its stored position, part of the pedestal forms part of the load bearing surface and part of the pedestal forms part of the side curb of the bearing surface.

The container support means may have means for preventing rotation of the pedestal longitudinally about a traverse axis. It may have means for preventing the pedestal from translating longitudinally. It may have means for securing the pedestal against transverse rotation once placed in its operative position. It may have means for securing the pedestal against substantial transverse rotation outwardly beyond its stored position. The container support means may have means for preventing rotation of the pedestal longitudinally about a traverse axis or translating longitudinally, means for securing the pedestal against transverse rotation once placed in its operative position, and means for securing the pedestal against further transverse rotation outwardly beyond its stored position.

The container support means may have first bearing means in the housing and first bearing means on the pedestal located in relationship to each other so that, when the pedestal is in the stored position, these bearing means bear against each other to prevent further outward rotation of the pedestal. The first housing bearing means may be sloped. The container support means may further have second bearing means in the housing and second bearing means on the pedestal located in relationship to each other so that, when the pedestal is in the operative position, these bearing means bear against each other to prevent further inward rotation of the pedestal. The second housing bearing means may be adapted to support a portion of the container loads. The second housing bearing means may be substantially horizontal. The pedestal bearing means may be adjustable at assembly.

The container support means may have means for locking the pedestal in its operative position to prevent outward rotation of the pedestal. The locking means may be a locking bar for lockingly engaging a surface of the pedestal and a surface of the housing. The pedestal housing may comprise a downwardly sloping surface. The pedestal may comprise a downwardly sloping surface. The surface on the pedestal may slope downwardly more steeply than the surface on the pedestal housing. The pedestal surface may slope downwardly more steeply than the pedestal housing surface by an angle of between 12° and 20°. The pedestal surface may slope downwardly more steeply than the pedestal housing surface by an angle of about 15°. The surface of the pedestal housing may slope downwardly at an angle to the horizontal of about 30° to about 75°. The surface of the pedestal may slope downwardly at an angle to the horizontal of about 45° to about 90°.

In the operative position the pedestal may be locked in a substantially vertical position. The locking bar may engage a downwardly sloped surface on the pedestal and a surface on the pedestal housing. The pedestal may define a slot in the container support means in which the locking bar is engaged. When the pedestal is in its operative position, the relative positions and the configurations of the pedestal engagement surface and the housing engagement surface may define a tapered slot in which the locking bar is engaged. The locking bar may be engaged in the tapered slot to remove slack and adjust for wear so as to lock the pedestal in a substantially vertical position.

The rotating means may be an axle connected to opposite sides of a housing in the vehicle and inserted through an aperture in the pedestal. On the pedestal about the aperture there may also be bearing means against which the axle bears.

The invention also relates to a container support means for use on an intermodal flat rail car having a load bearing platform. There is a pedestal for supporting containers. The pedestal has a surface which slopes downwardly at an angle of about 45°. There is means in the rail car for supporting the pedestal. The means for supporting the pedestal defines a housing in the rail car into which a substantial portion of the pedestal may be inserted. The housing may be defined in part by a slot in the rail car platform. The housing may be defined in part by a slot in the means for supporting the pedestal. The configuration of the pedestal and the configuration of the housing are such that, when the pedestal is in its operative position and when the pedestal is in its stored position, the pedestal substantially covers the slot in the platform of the rail car and, when the pedestal is in its stored position, it forms part of the load bearing surface of the rail car platform. The housing has a surface which slopes downwardly at an angle about 15° less than the slope of the downwardly sloping pedestal surface, or about 30°. An axle is supported by opposite sides of the housing and is inserted through an aperture in the pedestal for rotating the pedestal outwardly about a longitudinal axis of the rail car from the substantially vertical operative position of the pedestal to its stored position approximately 45° from the vertical.

First bearing means in the housing and adjustable first bearing means on the pedestal are located in relationship to each other so that, when the pedestal is in the stored position, these bearing means bear against each other to prevent further outward rotation of the pedestal. Second bearing means in the housing and adjustable second bearing means on the pedestal are located in relationship to each other so that, when the pedestal is in the operative position, these bearing means bear against each other to prevent further inward rotation of the pedestal. A locking bar engages the downwardly sloping surface of the pedestal and the downwardly sloping surface of the housing to lock the pedestal in its operative position to prevent outward rotation of the pedestal during use. The locking bar may be engaged in a slot in the pedestal and a tapered slot defined by the relative positions and configurations of the pedestal and the housing surfaces to remove slack.

The invention also relates to a pedestal support housing in a freight vehicle having a platform. The housing supports a pedestal moveable between an operative position for supporting containers and a stored position. The housing is defined in part by a slot in the platform of the vehicle and comprises a space into which a substantial portion of the pedestal may be inserted. A substantial portion of the pedestal may be inserted into the housing by rotating the pedestal less than 90° from the vertical. A substantial portion of the pedestal may be inserted into the housing by rotating the pedestal about 45° from the vertical. The pedestal may be moved to its stored position by rotating the pedestal about 45° from the vehicle.

The housing may be configured in relation to the pedestal so that, when the pedestal is in its stored position, the pedestal substantially fills the slot in the platform of the vehicle. The housing may be configured in relation to the pedestal so that, when the pedestal is in its operative position, the pedestal substantially fills the slot in the platform of the vehicle. The housing may be configured in relation to the pedestal so that, when the pedestal is in its operative position and when the pedestal is in its stored position, the pedestal substantially fills the slot in the platform of the vehicle.

The pedestal support housing may have means for preventing the pedestal from rotating longitudinally about a transverse axis and from translating longitudinally, means for securing the pedestal against further transverse rotation inwardly beyond its operative position, and means for securing the pedestal against further transverse rotation once placed in its stored position. One of the securing means may be a bearing surface on the housing. The bearing surface for securing the pedestal against transverse rotation once placed in its operative position may be a substantially horizontal bearing means which prevents further inward rotation of the pedestal. The bearing surface for securing the pedestal against transverse rotation once placed in its stored position may be a substantially sloped bearing means which prevents outward rotation of the pedestal. A locking bar which engages the pedestal may bear against a bearing surface to lock the pedestal in its operative position and prevent outward rotation of the pedestal. The bearing surface against which the locking bars is engaged may be downwardly sloped.

The invention further relates to a pedestal support housing in a freight vehicle having a platform. The housing supports a pedestal moveable between an operative position for supporting containers and a stored position. The housing is defined in part by a slot in the platform of the vehicle. The housing defines a space into which a substantial portion of the pedestal may be inserted by rotating the pedestal about 45° from the vertical. The housing is configured in relation to the pedestal so that, when the pedestal is in its operative position and when the pedestal is in its stored position, the pedestal substantially fills the slot in the platform of the vehicle. The housing has a first bearing surface for preventing the pedestal from rotating longitudinally about a transverse axis, a second bearing surface securing the pedestal against substantial transverse inward rotation once placed in its operative position, a third bearing surface for securing the pedestal against transverse outward rotation once placed in its stored position, and a fourth bearing surface for engaging a locking bar which also engages the pedestal to lock the pedestal in its operative position and prevent outward rotation of the pedestal.

The invention also relates to a freight vehicle comprising a container support means as described, a pedestal support housing as described, or both. The freight vehicle may also have fixed container support means, moveable container support means, or both. The freight vehicle may be a flat rail car.

BRIEF DESCRIPTION OF THE DRAWINGS

In drawings which illustrate embodiments of the invention.

The container support pedestal, the container pedestal support housing and the rail car of the present invention will now be described in relation to a preferred embodiment illustrated in the drawings.

DESCRIPTION OF A PREFERRED EMBODIMENT

An all purpose intermodal flat rail car 20 is commonly made up of five units. Three units are intermediate units 22 of the type shown loaded with a full length trailer 24 in FIG. 1, and in FIG. 2. An end unit 26 is shown on the right loaded with two 20 foot intermodal containers 28, 30 in FIG. 1 and in FIG. 2. There is a corresponding end unit on the left end of the intermediate units.

Figure 1:
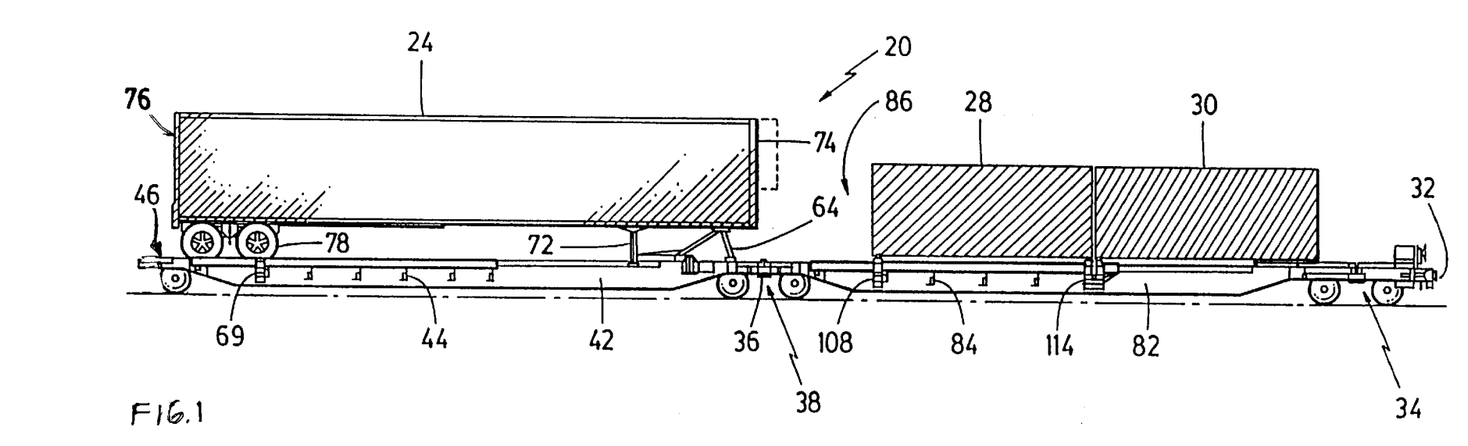
FIG. 1 is an elevational view of an intermediate unit of an all purpose intermodal flat rail car combination when loaded with a full length trailer and an end unit of an all purpose flat rail car combination when loaded with two short intermodal containers.
Figure 2:
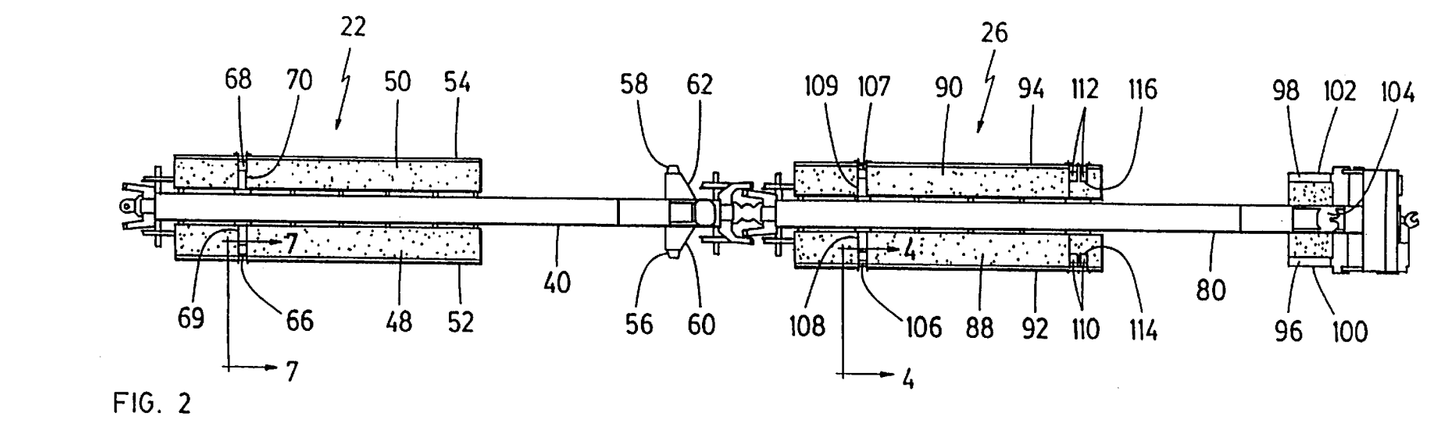
FIG. 2 is a plan view of the units of the flat rail car combination shown in FIG. 1 without the trailer or containers loaded thereon.

The end unit 26 has a conventional coupler 32 at its exterior or right end adjacent the end truck 34. The end unit 26 has an articulated connector 36 at its interior or left end connecting it to an intermediate unit. The shared intermediate truck 38 supports the two end units through the articulated connector 36.

In the embodiment described and illustrated, all units are capable of carrying a long container between 40 and 53 feet long and weighing up to 67,000 lbs. or one trailer between 28 and 53 feet long and weighing up to 65,000 lbs. The end units 26 can alternatively carry two 20 feet long containers 28, 30 which can have a combined weight of up to 106,000 lbs.

In this embodiment, the intermediate unit 22 shown in FIGS. 1 and 2 has a centre sill 40 spanning its length. The centre sill 40 is constructed of a box section of fish-belly type 42. Trailer platform supports 44 extend outwardly from the centre sill box section 42. Supported by the trailer platform supports 44, parallel to the centre sill 40 and along its outer sides on the bogie end 46, are trailer platforms 48, 50. The trailer platforms 48, 50 have respective platform curbs 52, 54.

Two fixed container support pedestals 56, 58 are located on arms 60, 62 adjacent the trailer hitch 64 shown in its raised position. Retractable container support pedestals 66, 68 are located on the respective outer ends of container support cross members 69, 70 under trailer platforms 48, 50 adjacent the bogie end 46 of the intermediate unit 22.

FIG. 1 shows a 53 foot long trailer 24 carried by the intermediate unit 22. The trailer landing gear 72 straddles, but does not rest on, the centre sill 40. The front of the trailer 74 rests on the trailer hitch 64 shown in a raised position. The rear of the trailer 76 rests on the trailer bogie 78, which is carried by the trailer platforms 48, 50. The retractable container support pedestals 66, 68, shown retracted to clear trailer bogie 78, are located at a nominal 40 feet spacing from fixed container support pedestals 56, 58, and can accommodate containers between 40 and 53 feet long.

The end unit 26 has a centre sill 80 spanning its length. The centre sill 80 is also constructed of a box section of fish-belly type 82. Trailer platform supports 84 extend outwardly from the centre sill box section 82. Supported by the trailer platform supports 84, parallel to the centre sill 80 and along its outer sides on the bogie end 86, are trailer platforms 88, 90. The trailer platforms 88, 90 have respective platform curbs 92, 94.

Two fixed container support pedestals 96, 98 are located on respective arms 100, 102 adjacent the trailer hitch 104. Retractable container support pedestals 106, 107 are located on the respective outer ends of container support cross members 108, 109 of trailer platforms 88, 90 adjacent the bogie end 86 of the end unit 26. The retractable container support pedestals 106, 107 are located at a nominal 40 feet spacing from fixed container support pedestals 96, 98, and can accommodate containers between 40 and 53 feet long. Near the other end of the trailer platforms 88, 90 are two pairs of intermediate retractable container support pedestals 110, 112 located on the respective outer ends of two double container support cross members 114, 116 under the trailer platforms 88, 90 and spaced to support the adjacent ends of the two 20 foot containers 28, 30.

FIG. 1 shows one of the shorter intermodal containers 28 supported by the retractable container support pedestals 106, 107 at the bogie end 86 and one pair of the intermediate retractable container support pedestals 110, 112. FIG. 1 also shows the other shorter intermodal container 30 supported by the fixed container support pedestals 96, 98 adjacent the trailer hitch 104 and the other pair of the intermediate retractable container support pedestals 110, 112.

In this embodiment, the end units are the only ones with two intermediate pairs of retractable container support pedestals 110, 112 near the centre of the car to support adjacent ends of the 20 foot containers 28, 30. However, the intermediate units 22 may also be provided with intermediate retractable container support pedestals.

Figure 3:
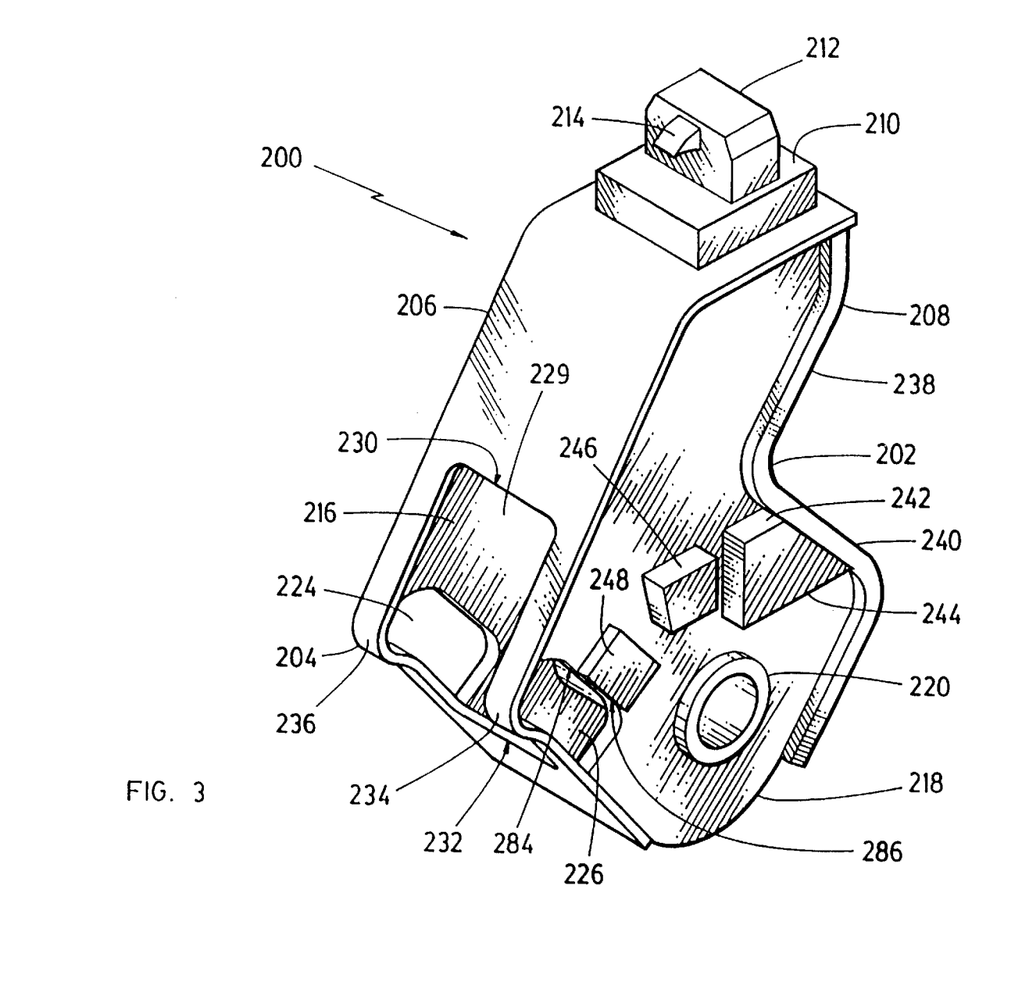
FIG. 3 is a perspective view of the container support pedestal of the present invention.
Figure 11:
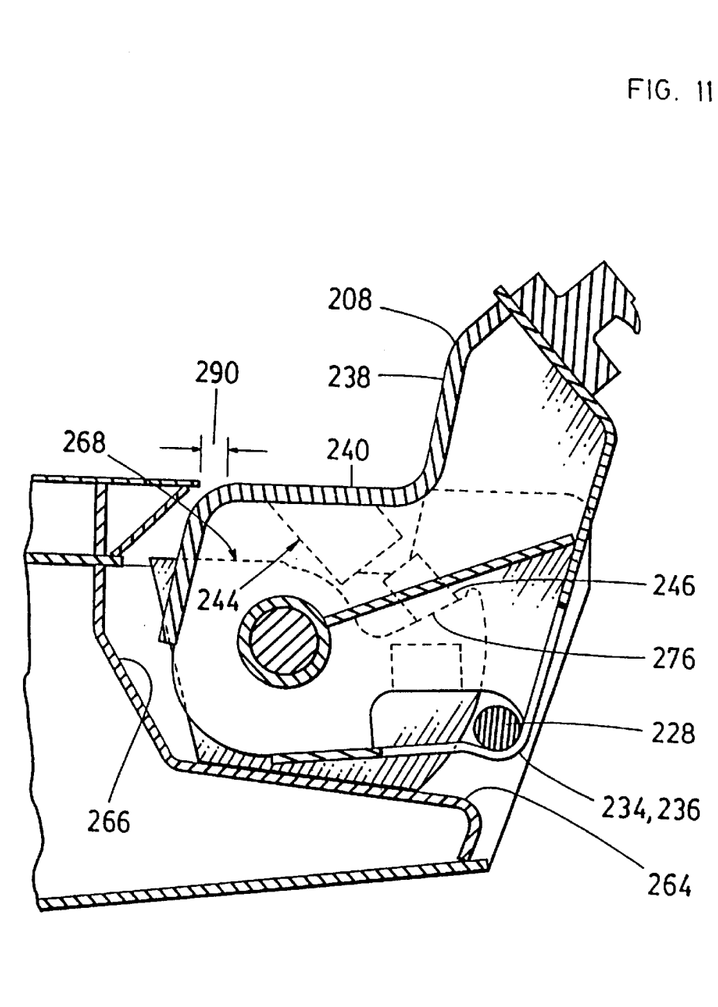
FIG. 11 is a cross sectional view of the container support pedestal of the present invention shown in its retracted position as in FIG. 7 taken along lines 11—11 of FIG. 8.
Figure 12:
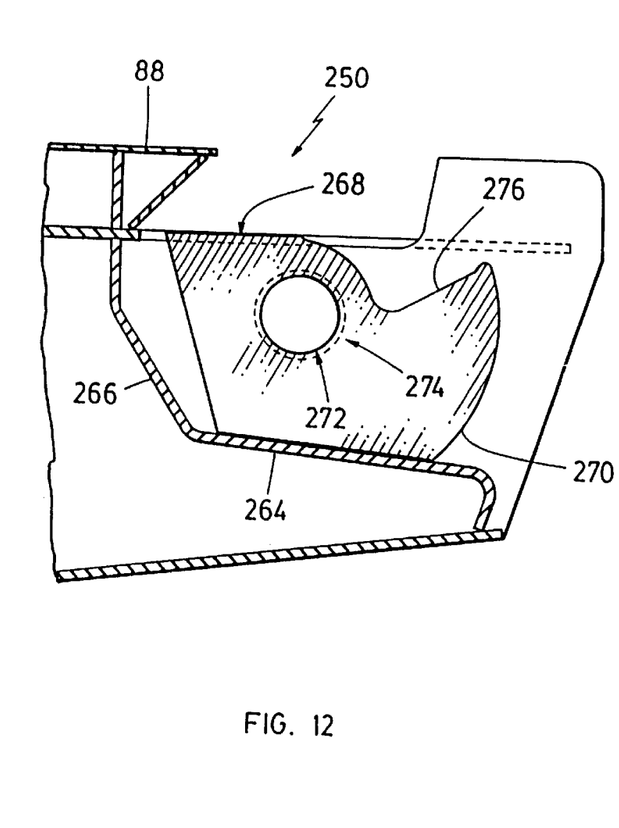
FIG. 12 is a cross sectional view of the container pedestal support housing without the container support pedestal of the present invention taken along the lines 12—12 of FIG. 5.

This invention relates to the retractable container support pedestal shown as 66, 68, 106, 107, 110, 112 in FIG. 2 and shown as 200 in FIG. 3 and the container pedestal support housing or pocket shown in FIG. 12. The invention also relates to a rail car with such pedestals or pockets. The pedestal is shown in the operative, or raised, position in FIGS. 4, 5, 6, and 10 and in the stored, or retracted, position in FIGS. 7, 8, 9 and 11.

The pedestal 200 is substantially L- or V-shaped. In its raised position shown in FIGS. 4 and 10, the inner 202 and outer 204 vertices of the pedestal point substantially horizontally. In its retracted position shown in FIGS. 7 and 11, the pedestal is oriented in a position which resembles an L. The pedestal has an outer surface 206 and an inner surface 208.

Figure 10:
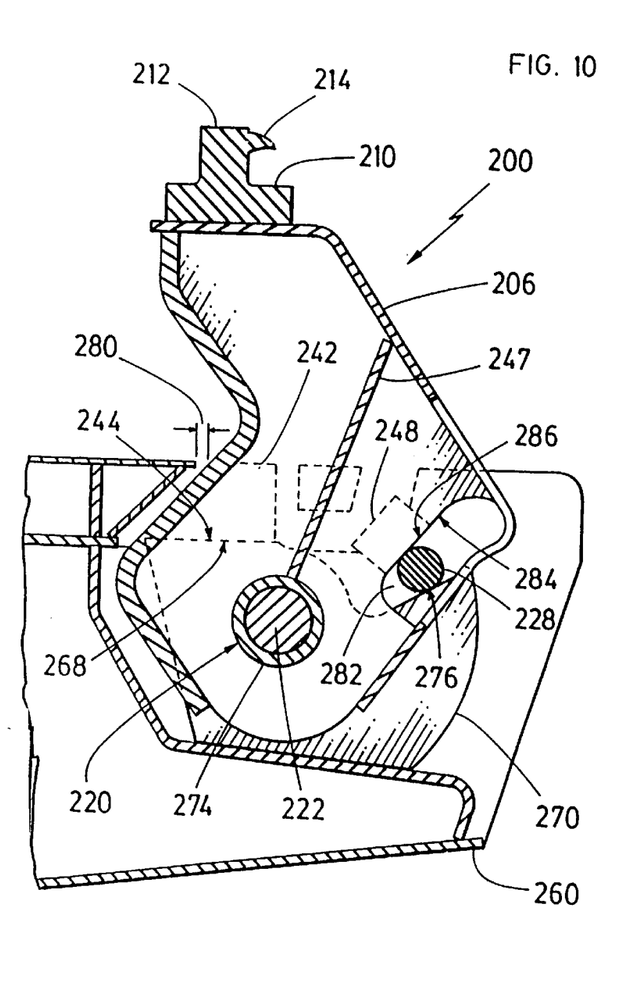
FIG. 10 is a cross sectional view of the container support pedestal of the present invention shown in its raised position as in FIG. 4 taken along the lines 10—10 of FIG. 5.

The pedestal is described with specific reference to FIGS. 3, 10 and 11. Along the upper portion of the outer surface 206 of the pedestal is a container bearing surface 210 in the form of a plate superimposed over the upper portion of the pedestal outer surface. On the container bearing surface 210 is a container locating cone 212. The container locating cone 212 has a container lock 214. The bearing surface 210, locating cone 212 and lock 214 may be one sub-assembly attached to surface 206.

Between the outer surface 206 and the inner surface 208 are two approximately parallel sides 216, 218 of the pedestal. A bearing sleeve 220 is located in each pedestal side 216, 218 through which is inserted a pedestal pivot pin 222. Also located in the pedestal sides 216, 218 are slots 224, 226 for a locking bar 228.

The outer surface 206 has an aperture 229 extending above and below vertex 204, providing hand access to locking bar 228, with upper and lower edges 230, 232 and side edges defined by retainer straps 234, 236. Along the upper portion of the pedestal's inner surface 208 is a tire guiding surface 238. Along the lower portion is the tire bearing surface 240.

On each side 216, 218 of the pedestal is a supporting lug 242, having a horizontal bearing surface 244 along its bottom, and a locating stop 246. An internal stiffener 247 braces the pedestal. Also located on each side 216, 218 of the pedestal is a supplementary bearing plate 248 adjacent the slots 224, 226.

An axis of the pedestal is defined by the line through the container cone 212 perpendicular to the container bearing surface 210 and offset laterally inwardly from the pivot pin 222 center from an axis of the supporting portion of the pedestal.

The container support pedestal housing, or pocket, is described with reference to FIGS. 4, 5, and 12. The housing 250 is built into the outer end of container support cross members 108, 109 which have two parallel sides 256, 258, a bottom flange or surface 260 and a top flange 262 under the trailer platform 88. The top flange outer end is forked around the two sides 256, 258 to leave the top open. Container support crossmembers 69, 70 are identical to those at 108, 109. Container support crossmembers 114, 116 have two similar housings side by side which share a central wall or partition. The following description applies to all of these container support pedestals and container support pedestal housings.

The housing or pocket 250 has lower 264 and inner 266 plate closures which seal the remainder of the box section container support cross member 108, 109 from rain, snow and dirt. This closure bottom surface is located well below the bearing surface 268 to minimize restriction caused by snow, and is sloped downwardly toward the outer end of the cross members 108, 109 to prevent water collection. The housing sides 256, 258 have support reinforcement 270 on each side which contain bearing surfaces for several components of the pedestal.

Figure 7:
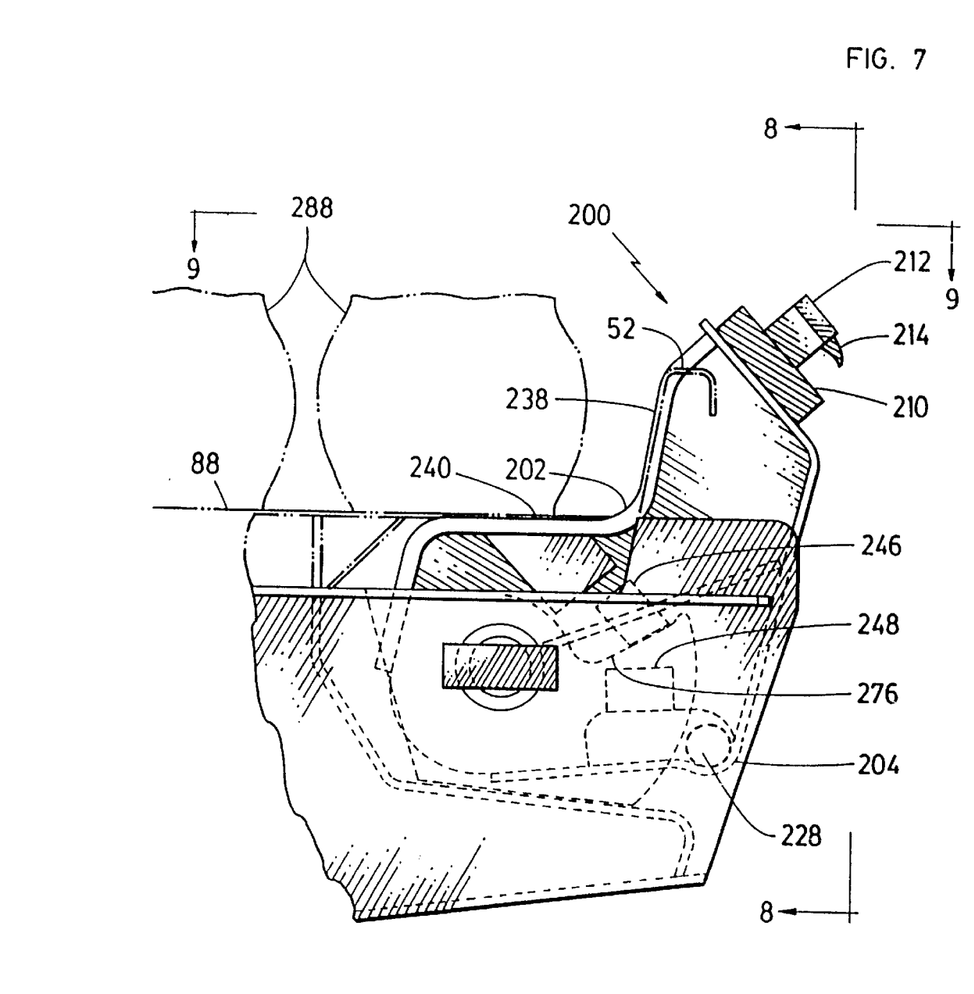
FIG. 7 is a cross sectional view of the container support pedestal of the present invention shown in its retracted position along the lines 7—7 of FIG. 2 with the platform in front of pedestal removed.
Figure 8:
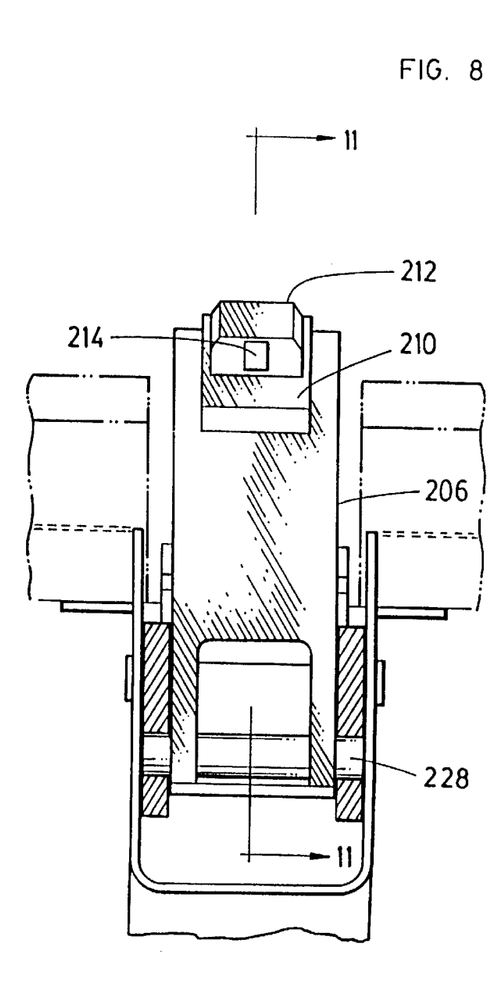
FIG. 8 is a side view of the container support pedestal of the present invention shown in its retracted position taken along the lines 8—8 of FIG. 7.
Figure 9:
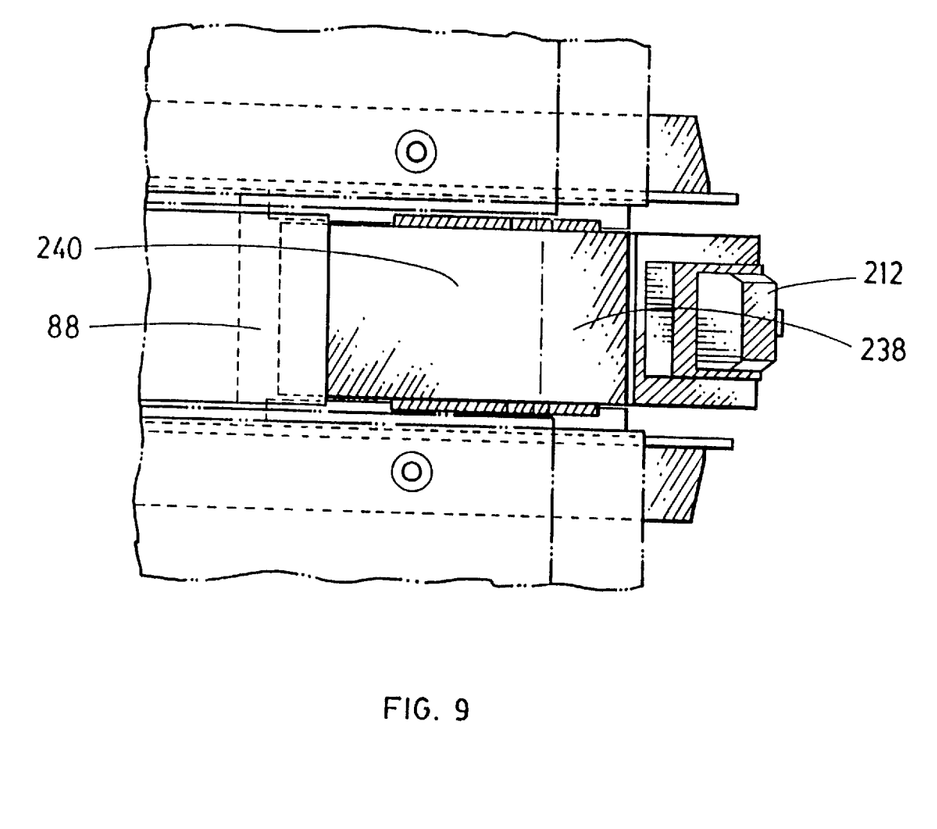
FIG. 9 is a plan view of the container support pedestal of present invention shown in its retracted position taken along the lines 9—9 of FIG. 7.

The reinforcement 270 has a number of bearing surfaces against which parts of the pedestal bear in the raised or retracted position. The pivot pin 222 bears on the circumference of hole 272. Longitudinal force is taken by bearing sleeve 220 bearing on the surface 274 around the pin hole. When the pedestal is in the raised position, as shown in FIGS. 4 and 10 and described below, the lower surface 244 of the supporting lugs 242 bear against horizontal bearing surface 268 and the locking bar 228 bears against the locking bar bearing surface 276. When the pedestal is in the retracted position, as shown in FIGS. 7 and 11 and also described below, the locating stops 246 engage the housing at bearing surface 276.

The container support pedestal and the container support pedestal housing of the present invention are now described with reference to the operation of the pedestal between the operative or raised position in FIGS. 4, 5, 6 and 10 and the stored or retracted position in FIGS. 7, 8, 9 and 11, with further reference to FIGS. 3 and 12.

Figure 4:
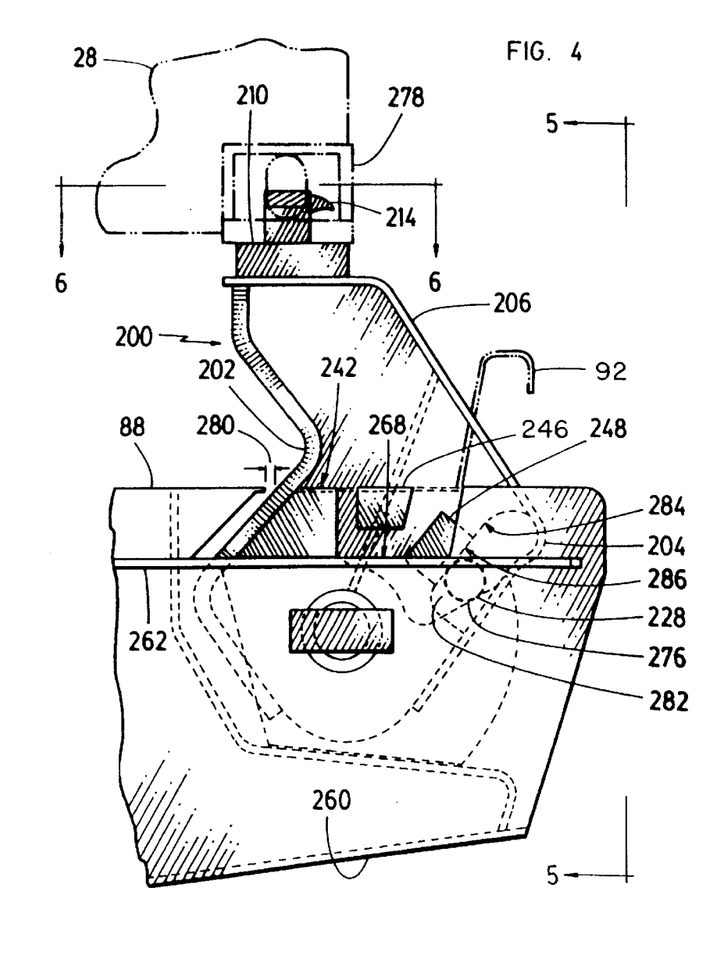
FIG. 4 is a cross sectional view of the container support pedestal of the present invention shown in its raised position along the lines 4—4 of FIG. 2 with the platform in front of pedestal removed.
Figure 5:
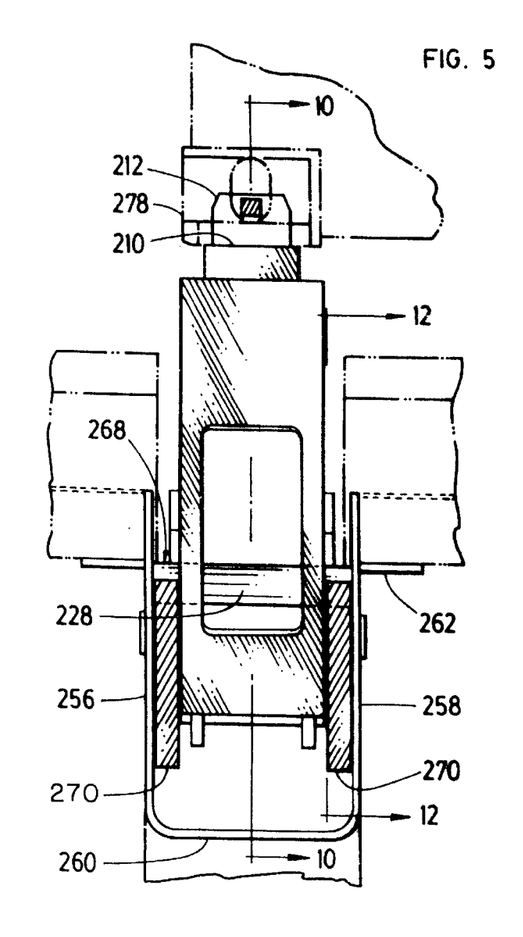
FIG. 5 is a side view of the container support pedestal of the present invention shown in its raised position from the side of the car taken along lines 5—5 of FIG. 4.
Figure 6:
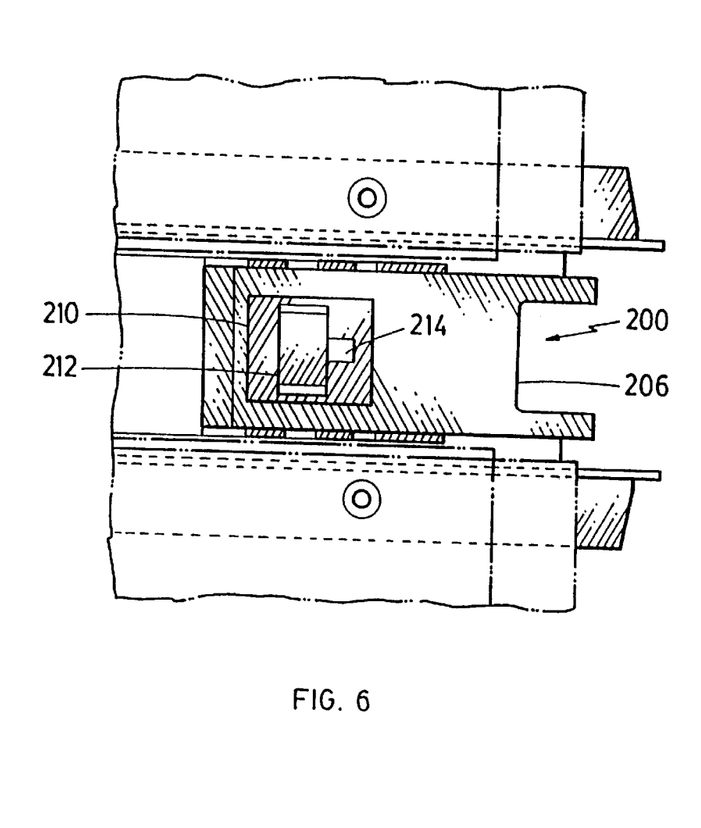
FIG. 6 is a plan view of the container support pedestal of the present invention shown in its raised position from the top taken along the lines 6—6 of FIG. 4.

The pedestal is shown in FIG. 4 in its raised substantially vertical position above the trailer platform surface 88. The container corner casting 278 of container 28 sits on the container bearing surface 210, and is located by the locating cone 212 and retained by the container lock 214.

The pedestal housing or pocket 250 has two horizontal surfaces on which the pedestal lugs bear when the pedestal is in the raised position. The bearing surface 244 of the supporting lugs 242 bears against the horizontal bearing surface 268 of the pocket reinforcement 270. Therefore much of the rocking load is supported by fixed stops rather than the pivot pin 222. This reduces the bearing stress on the pivot pin 222. These lugs 242 are adjustable so the raised position can be controlled to align with the container openings. The lugs are adjustable at assembly and accessible for welding when the pedestal is in place. The pedestal is located longitudinally by bearing sleeve ends 220 engaging the vertical face 274 of reinforcement 270 with a small clearance. In the raised position, the pedestal substantially fills the slot in the platform defining the housing, so that gap 280 is at a minimum.

When the pedestal is raised, the locking bar 228 falls down into the tapered slot 282 defined by the pedestal slot bearing surface 284 and the locking bar bearing surface 276 on reinforcement 270. Bearing plate 248 acts as a reinforcing bearing surface 286 for the pedestal slot bearing surface 284. The surface of the pedestal housing 276 slopes downwardly at an angle of about 30° to the horizontal to resist lateral acceleration. The surface of the pedestal slot bearing surface 284 slopes downwardly, but at an angle of about 15° steeper to be self locking against container force. The locking bar 228 wedges in the tapered slot 282 to remove any slack which could cause rocking of the pedestal. The wedge angle of the tapered slot 282 is such that friction prevents the locking bar 228 from being moved by force from the pedestal, but the bar 228 can be lifted to the top of the tapered slot 282 to permit the pedestal to be rotated outwardly.

This locking device automatically locks the pedestal in the raised position. The locking device is a rugged arrangement which is designed to resist the impact of containers during loading and car coupling and lateral accelerations during car movement. The pedestal is thus firmly secured against rocking in either lateral direction while in its raised position. In contrast, the pedestals currently in use described above are only secured firmly in one lateral direction, and rock inwardly some distance only limited by the cover doors.

The pedestal is shown in FIG. 7 in its retracted position. In this position the profile of the inner surface 208 of the pedestal is such that it forms a tire bearing surface 240 corresponding to trailer platform surface 48, 88, and tire guiding surface 238 which is aligned closely with the inner sloped surface of the typical outer curb 52 of the trailer bogie platform 48. The trailer bogie tires 288 are thus guided toward the tire bearing surface 240.

When the pedestal is retracted, the locating stops 246 engage the bearing surface 276 of reinforcement 270 and the weight of the pedestal holds the locating stops 246 against the bearing surface 276. These locating stops 246 are adjustable so the side of the pedestal can be aligned with the platform curb 52 to guide trailer tires 288. The locating stops are adjustable at assembly and accessible for welding when the pedestal is in place. In the retracted position, the pedestal substantially fills the slot 290 in the platform defining the housing.

The pedestal cannot rotate longitudinally. In its raised position, the pedestal is secured against lateral rotation about a longitudinal axis. In its retracted position, the pedestal is secured against outward lateral rotation. The tire bearing portion 240 of the profile of the inner surface 208 is shaped so that the openings in the slots 290 in the platforms 48, 50 defined by the housing are minimized in both the raised and retracted positions. In both positions, the pedestal substantially fills the slot 280, 290. Therefore, doors are not required to cover the area where trailer tires may bear. There are thus no doors to be opened, closed or damaged.

The container support pedestals rotate outwardly less than 90°, in this case approximately 45°, about a longitudinal axis rather than about a longitudinal axis, laterally 90° inwardly or 180° outwardly, or about a transverse axis 90° longitudinally, as in the type of container support pedestals currently used and described above. This lesser rotation in the pedestal of this invention significantly reduces the effort required to raise the pedestal. It also permits raising or retracting the pedestal by pushing or pulling from ground level. This is a more ergonomic movement than lifting the pedestal out of a platform recess or pedestal pocket from below foot level while standing on the platform.

It will be appreciated that the present invention has been described with reference to a preferred embodiment and that the scope of the invention as defined by the claims is not limited by the preferred embodiment.

What is claimed is:

1. A container support in combination with a vehicle having a load bearing platform, the container support comprising:
    (a) a housing disposed below the load bearing platform, the load bearing platform having a slot therein for access to the interior of the housing; and
    (b) a pedestal pivotally mounted in the housing, the pedestal having a leg which extends through the slot, the leg having a container bearing surface, the pedestal also having a freight bearing surface, oriented generally normal to the leg;
wherein the pedestal is pivotable between an operative position and a stored position such that, in the operative position, the container bearing surface of the leg is oriented substantially horizontally and, in the stored position, the freight bearing surface is substantially level with the load bearing platform and the leg forms a side curb.

2. An apparatus as claimed in claim 1, wherein the configuration of the housing and the configuration of the pedestal are such that, when the pedestal is in the operative position, the pedestal substantially fills the slot in the platform of the vehicle.

3. An apparatus as claimed in claim 1, wherein the configuration of the housing and the configuration of the pedestal are such that, when the pedestal is in the stored position, the pedestal substantially fills the slot in the platform of the vehicle.

4. An apparatus as claimed in claim 1, further comprising means for preventing the pedestal from rotating longitudinally about a traverse axis.

5. An apparatus as claimed in claim 1, further comprising means for preventing the pedestal from translating longitudinally.

6. An apparatus as claimed in claim 1, further comprising means for securing the pedestal against transverse rotation once placed in the operative position.

7. An apparatus as claimed in claim 1, wherein the housing comprises a first bearing surface and the pedestal comprises a corresponding first bearing surface which are located in relationship to each other such that, when the pedestal is in the stored position, these bearing surfaces bear against each other to prevent outward rotation of the pedestal.

8. An apparatus as claimed in claim 1, wherein the housing comprises a bearing surface and the pedestal comprises a corresponding bearing surface which are located in relationship to each other such that, when the pedestal is in the operative position, these bearing surfaces bear against each other to prevent inward rotation of the pedestal.

9. An apparatus as claimed in claim 8, wherein in the stored position the leg of the pedestal is oriented substantially vertically.

10. An apparatus as claimed in claim 8, wherein the housing bearing surface is adapted to support a portion of a load.

11. An apparatus as claimed in claim 1, further comprising means for locking the pedestal in the operative position to prevent outward rotation of the pedestal.

12. An apparatus as claimed in claim 11, wherein the locking means comprises a locking bar for lockingly engaging a surface of the pedestal and a surface of the housing.

13. An apparatus as claimed in claim 1, wherein the vehicle is an intermodal rail car comprising a side curb, and wherein the side curb formed by the leg, when in the stored position, is generally co-planar with the rail car side curb.

14. An apparatus as claimed in claim 1, wherein the pedestal pivots from the operative position to the stored position through an angle of less than 90 degrees about a longitudinal axis of the vehicle.

15. An apparatus as claimed in claim 14, wherein the angle is about 45 degrees.

16. An apparatus as claimed in claim 1, wherein, in the operative position, the pedestal freight bearing surface is orientated at an angle of about 45 degrees from the vertical.

17. An apparatus as claimed in claim 1, wherein the housing has a bar engagement surface which slopes downwardly at a first angle in the range of between about 30 degrees to about 75 degrees, and wherein the pedestal has a bar engagement surface which, when the pedestal is in the operative position, slopes downwardly at a second angle in the range of between 12 degrees to 20 degrees steeper than the first angle, and comprising a locking bar which engages the downwardly sloping surface of the pedestal and the downwardly sloping surface of the housing to lock the pedestal in the operative position and prevent outward rotation of the pedestal.

18. An apparatus as claimed in claim 17, wherein, when the pedestal is in the operative position, the relative positions and the configurations of the pedestal engagement surface and the housing engagement surface define a tapered slot in which the locking bar is engaged.

19. An apparatus as claimed in claim 18, wherein the locking bar is engaged in the tapered slot to remove slack so as to lock the pedestal in a substantially vertical position.

20. An apparatus as claimed in claim 17, wherein the pedestal defines a slot therein which includes said bar engagement surface of said pedestal and in which the locking bar is engaged.

21. An apparatus as claimed in claim 17, wherein the first angle is about 30 degrees and the second angle is about 15 degrees steeper than the first angle.

22. An apparatus as claimed in claim 1, wherein the container bearing surface of the leg comprises a container locating cone.

23. An apparatus as claimed in claim 22, wherein the container bearing surface of the leg comprises a container lock.

24. A container support in combination with an intermodal flat rail car having a load bearing platform, the container support comprising:

(a) a pedestal for supporting containers, the pedestal having a surface which slopes downwardly at an angle of about 45° when the pedestal is in an operative position;

(b) means for supporting the pedestal defining a housing into which a substantial portion of the pedestal may be inserted, the housing defined in part by a slot in the rail car platform and in part by a slot in the pedestal supporting means, wherein the configuration of the pedestal and the configuration of the housing are such that, when the pedestal is in the operative position and when the pedestal is in a stored position, the pedestal substantially covers the slot in the platform of the rail car, and when the pedestal is in its stored position it forms part of the load bearing platform of the rail car, the housing having a surface which slopes downwardly at an angle of about 30°;

(c) an axle supported by opposite sides of the housing and inserted through an aperture in the pedestal for pivoting of the pedestal outwardly about a longitudinal axis of the rail car from the operative position of the pedestal to its stored position approximately 45° from the vertical;

(d) first bearing means in the housing and adjustable first bearing means on the pedestal located in relationship to each other so that, when the pedestal is in the stored position, these bearing means bear against each other to prevent outward rotation of the pedestal, said first bearing means in the housing including said downwardly sloping housing surface;

(e) second bearing means in the housing and adjustable second bearing means on the pedestal located in relationship to each other so that, when the pedestal is in the operative position, these second bearing means bear against each other to prevent substantial inward rotation of the pedestal; and (f) a locking bar which engages the downwardly sloping surface of the pedestal and the downwardly sloping surface of the housing to lock the pedestal in its operative position to prevent outward rotation of the pedestal during use.

25. A rail car having a load bearing platform and a container support which comprises:

(a) a housing disposed below the the load bearing platform, the load bearing platform having a slot therein for access to the interior of the housing; and (b) a pedestal pivotally mounted in the housing, the pedestal having a leg which extends through the slot, the leg having a container bearing surface, the pedestal also having a freight bearing surface, oriented generally transverse of the leg;

wherein the pedestal is pivotable between an operative position and a stored position such that, in the operative position, the container bearing surface of the leg is oriented substantially horizontally and, in the stored position the freight bearing surface is substantially level with the load bearing platform and the legs forms a side curb thereby enabling the pedestal to support a load.

\* \* \* \* \*